United States Patent

Boettiger (10) Patent No.: US 9,438,868 B2
(45) Date of Patent: Sep. 6, 2016

(54) ADAPTIVE IMAGE SENSOR SYSTEMS AND METHODS

(71) Applicant: Semiconductor Components Industries, LLC, Phoenix, AZ (US)

(72) Inventor: Ulrich Boettiger, Garden City, ID (US)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 150 days.

(21) Appl. No.: 14/180,237

(22) Filed: Feb. 13, 2014

(65) Prior Publication Data

US 2015/0229889 A1 Aug. 13, 2015

(51) Int. Cl.
*H04N 9/09* (2006.01)
*H04N 7/18* (2006.01)
*H04N 5/225* (2006.01)
*H04N 5/232* (2006.01)
*H04N 5/235* (2006.01)

(52) U.S. Cl.
CPC .............. *H04N 9/09* (2013.01); *H04N 5/2258* (2013.01); *H04N 5/2351* (2013.01); *H04N 5/23222* (2013.01); *H04N 5/23241* (2013.01); *H04N 7/188* (2013.01)

(58) Field of Classification Search
CPC .......... H04N 9/09; H04N 5/335; H04N 7/18; H04N 5/2257; H04N 5/23222; H04N 5/23241; H04N 5/2351; H04N 5/2258; H04N 7/188

See application file for complete search history.

(56) References Cited

U.S. PATENT DOCUMENTS

| | | | |
|---|---|---|---|
| 8,295,344 B2 | 10/2012 | Jiang et al. | |
| 8,319,859 B2 | 11/2012 | Kim et al. | |
| 8,508,622 B1 | 8/2013 | Anon | |
| 8,970,654 B1* | 3/2015 | Johnson | H04N 7/181 348/14.07 |
| 2007/0182540 A1* | 8/2007 | Marman | G06K 9/00362 340/506 |
| 2010/0045821 A1 | 2/2010 | Mergler | |
| 2010/0053345 A1 | 3/2010 | Kim et al. | |
| 2012/0127315 A1* | 5/2012 | Heier | H04N 7/181 348/150 |
| 2012/0327242 A1 | 12/2012 | Barley et al. | |
| 2013/0083216 A1* | 4/2013 | Jiang | H04N 9/735 348/223.1 |
| 2013/0271602 A1* | 10/2013 | Bentley | H04N 7/18 348/143 |
| 2013/0293753 A1* | 11/2013 | Keelan | H04N 5/3745 348/302 |

* cited by examiner

*Primary Examiner* — Mekonnen Dagnew
(74) *Attorney, Agent, or Firm* — Treyz Law Group, P.C.; Joseph F. Guihan (57) ABSTRACT

An imaging device may include a primary imaging sensor and a secondary imaging sensor. The secondary imaging sensor may monitor a scene being imaged by the imaging device for trigger criteria such as sudden movement, changes in the intensity of ambient light, and the presence of a particular object or person. Upon detection of relevant trigger criteria, the imaging device may activate the primary imaging sensor and capture one or more images of the scene with the primary imaging sensor. Operational parameters of the primary imaging sensor including framerate and exposure settings may be based on data from the secondary imaging sensor. The secondary imaging sensor may have a lower power consumption than the primary imaging sensor such that monitoring the scene with the secondary imaging sensor and only activating the primary imaging sensor upon detection of the relevant trigger criteria enables an efficient and adaptive imaging system.

17 Claims, 5 Drawing Sheets

ADAPTIVE IMAGE SENSOR SYSTEMS AND METHODS

BACKGROUND

The present invention relates to imaging devices, and, more particularly, to adaptive image sensor systems and methods.

Modern electronic devices such as cellular telephones, cameras, and computers often use digital image sensors. Imagers (i.e., image sensors) often include a two-dimensional array of image sensing pixels. Each pixel typically includes a photosensor such as a photodiode that receives incident photons (light) and converts the photons into electrical signals.

In conventional imaging systems, a digital image sensor captures images of a scene at a fixed frame rate. However, it is often the case that many of the captured frames are unnecessary. Consider, as an example, an imaging system being used as a security camera in a low-traffic area. Many images captured by the imaging system will be identical (and therefore not useful) as movement in the low-traffic area is rare. However, the imaging system will still generally need to capture images at a high frame rate, to be able to adequately capture video of any events (such as a security breach) that do occur. While conventional imaging systems often reduce the frame rate of captured video in post-processing, in order to reduce the amount of storage space needed to archive the video; having the digital image sensor continually capture images at the fixed frame rate increases power consumption and results in other limitations on image sensor performance and cost.

It would therefore be desirable to be able to provide improved image sensor systems.

DETAILED DESCRIPTION

Figure 1:
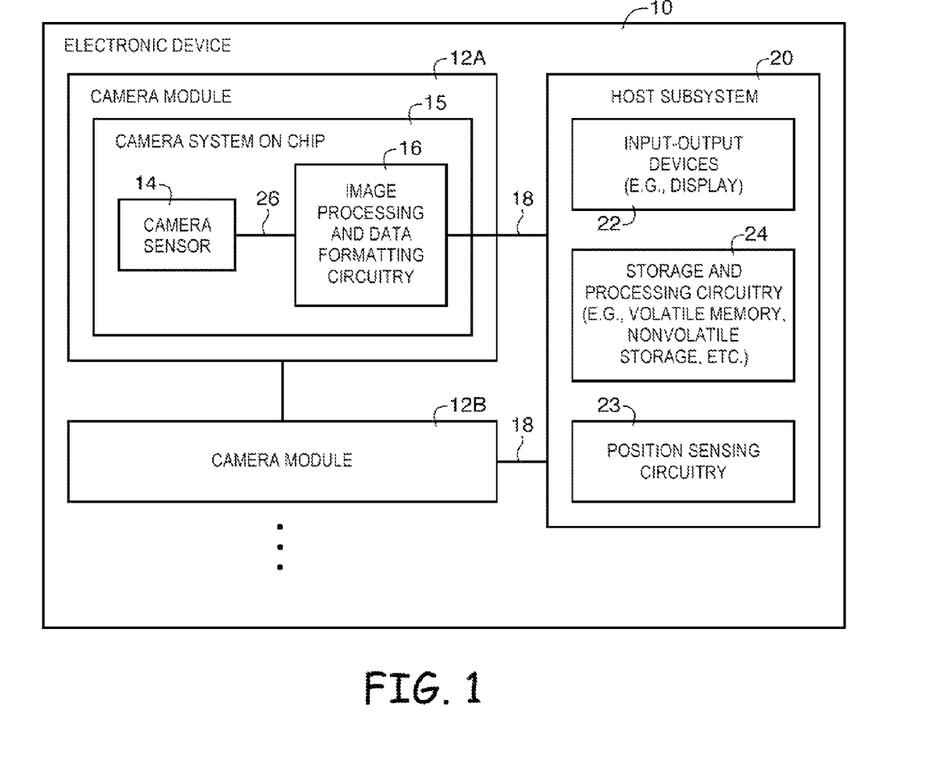
FIG. 1 is a diagram of an electronic device and computing equipment that may include an adaptive image sensor system in accordance with embodiments of the present invention.

Digital camera modules are widely used in electronic devices. An electronic device with a digital camera module is shown in FIG. 1. Electronic device 10 may be a digital camera, a laptop computer, a display, a computer, a cellular telephone, or other electronic device. Device 10 may include one or more imaging systems such as imaging systems 12A and 12B (e.g., camera modules 12A and 12B) each of which may include one or more image sensors 14 and corresponding lenses. During operation, a lens focuses light onto an image sensor 14. The lens may have fixed aperture. The pixels in image sensor 14 include photosensitive elements that convert the light into digital data. Image sensors may have any number of pixels (e.g., hundreds or thousands or more). A typical image sensor may, for example, have millions of pixels (e.g., megapixels). In high-end equipment, sensors with 10 megapixels or more are not uncommon. In at least some arrangements, device 10 may include two (or more) image sensors 14, which may capture images from different perspectives. When device 10 includes two image sensors 14, device 14 may be able to capture stereo images.

Still and video image data from camera sensor 14 may be provided to image processing and data formatting circuitry 16 via path 26. Image processing and data formatting circuitry 16 may be used to perform image processing functions such as adjusting white balance and exposure and implementing video image stabilization, image cropping, image scaling, etc. Image processing and data formatting circuitry 16 may also be used to compress raw camera image files if desired (e.g., to Joint Photographic Experts Group or JPEG format).

In some arrangements, which is sometimes referred to as a system on chip or SOC arrangement, camera sensor 14 and image processing and data formatting circuitry 16 are implemented as a common unit 15 (e.g., on a common integrated circuit, or stacked together). The use of a single integrated circuit to implement camera sensor 14 and image processing and data formatting circuitry 16 can help to minimize costs. If desired, however, multiple integrated circuits may be used to implement circuitry 15. In arrangements in which device 10 includes multiple camera sensors 14, each camera sensor 14 and associated image processing and data formatting circuitry 16 can be formed on a separate SOC integrated circuit (e.g., there may be multiple camera system on chip modules such as modules 12A and 12B).

To save space and simplify assembly by a manufacturer of a camera or other electronic device in which imaging capabilities are desired, it may be desirable to stack a processor (e.g., processing circuitry 16, or a processor in camera sensor 14) and an imager (e.g., camera sensor 14) to form a preassembled image sensor unit 15. An image sensor unit 15 that is formed in this way has the image sensing capabilities of the imager and the processing capabilities of the processor in a single component. Additionally, in arrangements in which the processor 16 (sometimes referred to herein as an image co-processor iCP) has a smaller area than the imager 14, forming the processor 16 on a separate wafer may decrease the cost of the processor 16, by allowing more processors 16 to be formed on each wafer. Moreover, processors 16 and imagers 14 may be formed on different types of wafers, each of which may be optimized for their respective use. As an example, a wafer of image co-processors 16 may be optimized for analog circuitry (to optimize the performance of analog circuitry in the image co-processors such as sample and hold circuitry, line buffers, and analog-to-digital converters) or digital circuitry (to optimize the performance of digital circuitry in the image co-processors such as image formatting circuitry). Meanwhile, the imager wafer may be optimized for optical performance. Optimization of wafers for analog, digital, and/or optical performance may involve altering the materials and methods used in forming completed wafers and the design and arrangement of circuits in the wafers, as examples.

Circuitry 15 conveys data to host subsystem 20 over path 18. Circuitry 15 may provide acquired image data such as captured video and still digital images to host subsystem 20.

Electronic device 10 typically provides a user with numerous high level functions. In a computer or advanced cellular telephone, for example, a user may be provided with the ability to run user applications. To implement these functions, electronic device 10 may have input-output devices 22 such as projectors, keypads, input-output ports, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include processors such as microprocessors, microcontrollers, digital signal processors, application specific integrated circuits, etc.

Device 10 may include position sensing circuitry 23. Position sensing circuitry 23 may include, as examples, global positioning system (GPS) circuitry, radio-frequency-based positioning circuitry (e.g., cellular-telephone positioning circuitry), gyroscopes, accelerometers, compasses, magnetometers, etc.

Figure 2:
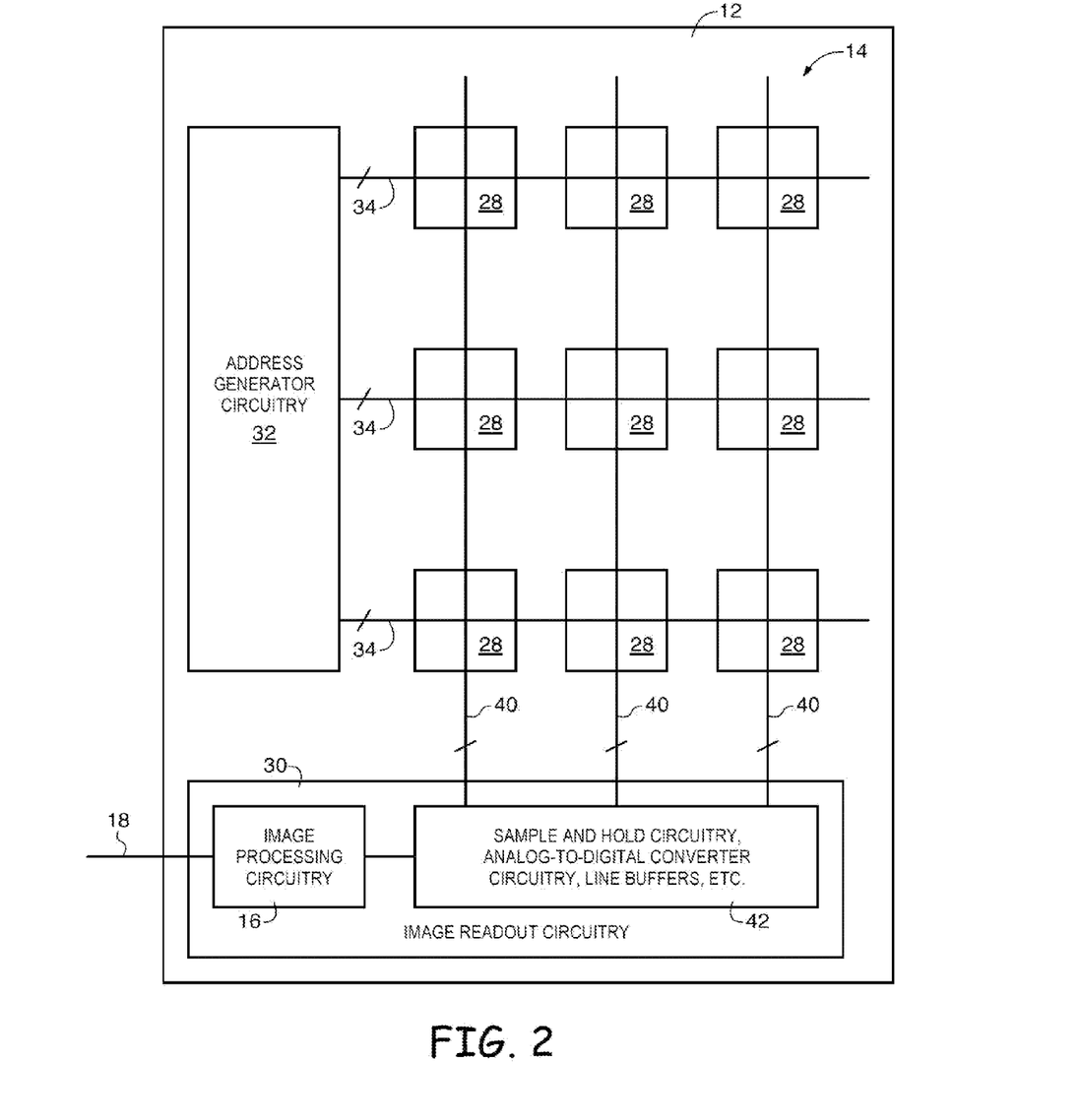
FIG. 2 is a diagram of an illustrative array of light-sensitive imaging pixels that may form an image sensor in an adaptive image sensor system in the electronic device of FIG. 1 in accordance with embodiments of the present invention.

An example of an arrangement for sensor array 14 is shown in FIG. 2. As shown in FIG. 2, device 10 may include an array 14 of pixels 28 coupled to image readout circuitry 30 and address generator circuitry 32. As an example, each of the pixels in a row of array 14 may be coupled to address generator circuitry 32 by one or more conductive lines 34. Array 14 may have any number of rows and columns. In general, the size of array 14 and the number of rows and columns in array 14 will depend on the particular implementation. While rows and columns are generally described herein as being horizontal and vertical rows and columns may refer to any grid-like structure (e.g., features described herein as rows may be arranged vertically and features described herein as columns may be arranged horizontally).

Address generator circuitry 32 may generate signals on paths 34 as desired. For example, address generator circuitry 32 may generate reset signals on reset lines in paths 34, transfer signals on transfer lines in paths 34, and row select (e.g., row readout) signals on row select lines in paths 34 to control the operation of array 14. If desired, address generator circuitry 32 and array 14 may be integrated together in a single integrated circuit (as an example).

Image readout circuitry 30 may include circuitry 42 and image processing and data formatting circuitry 16. Circuitry 42 may include sample and hold circuitry, analog-to-digital converter circuitry, and line buffer circuitry (as examples). As one example, circuitry 42 may be used to measure signals in pixels 28 and may be used to buffer the signals while analog-to-digital converters in circuitry 42 convert the signals to digital signals. In a typical arrangement, circuitry 42 reads signals from rows of pixels 28 one row at a time over lines 40. With another suitable arrangement, circuitry 42 reads signals from groups of pixels 28 (e.g., groups formed from pixels located in multiple rows and columns of array 14) one group at a time over lines 40. The digital signals read out by circuitry 42 may be representative of charges accumulated by pixels 28 in response to incident light. The digital signals produced by the analog-to-digital converters of circuitry 42 may be conveyed to image processing and data formatting circuitry 16 and then to host subsystem 20 (FIG. 1) over path 18.

If desired, some or all of camera sensor 14 may be used to detect changes in a scene being observed by camera sensor 14. Control circuitry in camera module 12 (or host subsystem 20) may then adapt the operation of the camera sensor 14 in response to the detected changes. As an example, the camera sensor 14 may detect an object moving at a speed across the scene above a given threshold and, in response, the control circuitry may increase the frame rate of the camera sensor 14 in order to adequately record the moving object. As another example, a relatively-low power secondary imaging sensor may be used to determine when a pre-set triggering condition is encountered and, in response, the control circuitry may activate a primary imaging sensor.

Figure 3:
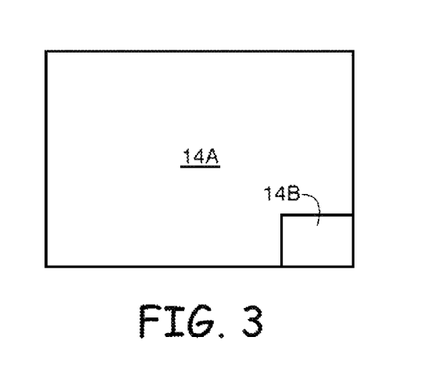
FIG. 3 is a diagram of an illustrative imaging sensor that may include a region used in a monitoring operation in an adaptive image sensor system in accordance with embodiments of the present invention.
Figure 4:
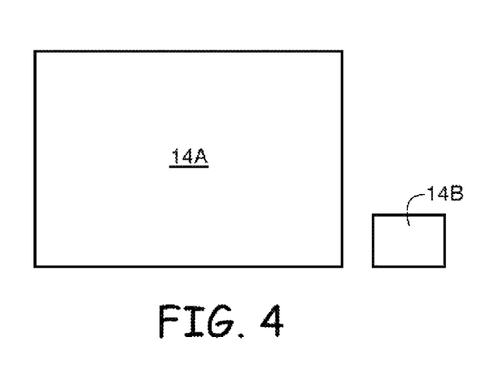
FIG. 4 is a diagram of an illustrative monitoring imaging sensor and a separate primary imaging sensor that may be used in an adaptive image sensor system in accordance with embodiments of the present invention.

As shown in the examples of FIGS. 3 and 4, camera sensor 14 may include a primary imaging sensor 14A and a secondary imaging sensor 14B. The secondary imaging sensor 14B may have lower power requirements than the primary imaging sensor 14A. Accordingly, the secondary imaging sensor 14B may have generally lower performance capabilities than the primary imaging sensor 14A. As examples, the secondary imaging sensor 14B may be a monochrome imaging sensor and may have a lower imaging resolution than the primary imaging sensor 14A. If desired, the secondary imaging sensor 14B may also be optimized for high speed operations (e.g., high frame rate operations) so that the operations of the primary imaging system 14A can be rapidly adjusted in response to changing conditions and in response to the detection of triggering conditions.

FIG. 3 illustrates an embodiment in which the secondary imaging sensor 14B is formed from a subset of the imaging pixels that form primary imaging sensor 14A. While FIG. 3 illustrates the secondary imaging sensor 14B as being formed in a corner of sensor 14A, this is merely one potential arrangement. As other examples, the secondary imaging sensor 14B may be formed from pixels that are dispersed (randomly, uniformly, or with some other particular order) throughout the primary imaging sensor 14A. In one example, imaging sensor 14 may be formed from an array of pixels including a repeating block of red, clear, blue, and green, where the clear pixels form secondary imaging sensor 14B and the red, blue, and green pixels form the primary imaging sensor 14A.

FIG. 4 illustrates another embodiment in which the secondary imaging sensor 14B is formed from a separate imaging sensor than the primary imaging sensor 14A. As illustrated in FIG. 4, the secondary imaging sensor 14B may generally have a smaller footprint and/or smaller resolution than the primary imaging sensor 14A, although alternative arrangements may be implemented. If desired, primary and secondary imaging sensors 14A and 14B may be formed on separate integrated circuit chips or may be integrated together on a single integrated circuit chip.

Figure 5:
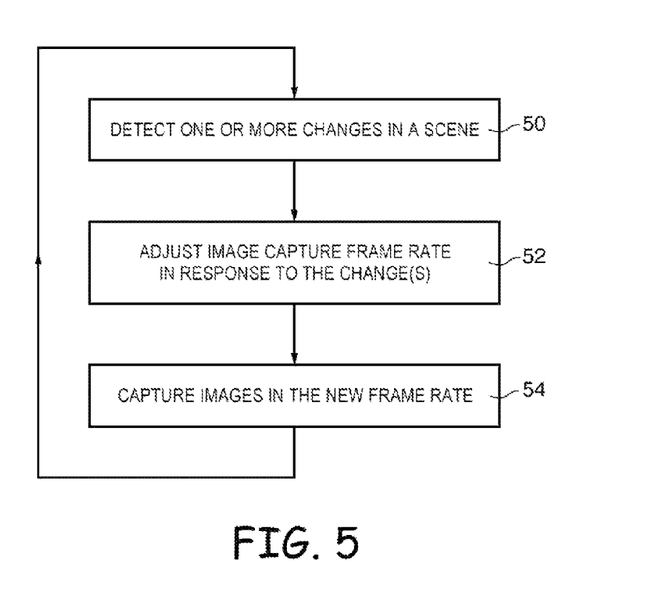
FIG. 5 is a flowchart of illustrative steps involved in adaptively adjusting a frame rate of an imaging system in response to changes in a scene in an adaptive image sensor system in accordance with embodiments of the present invention.

A flowchart of illustrative steps involved in adaptively adjusting image sensor operating conditions such as a frame rate is shown in FIG. 5. As shown by step 50 in FIG. 5, camera module 12 may detect one or more changes in a scene being imaged by the camera module 12. The changes may include changes in the amount and velocity of movement in the scene. The changes may be detected from a primary imaging sensor such as sensor 14A, by a secondary imaging sensor such as sensor 14B, or by a combination of sensors 14A and 14B. As an example, whenever primary sensor 14A is in a low power standby mode, the secondary sensor 14B may look for changes in the scene in step 50. Further, when the primary sensor 14A is capturing images of the scene, the secondary sensor 14B may either continue to look for changes in the scene or may itself be placed into a low power standby mode, with the operations of step 50 being taken over by the primary sensor 14A. As part of step 50, image processing circuitry 16 and/or processing circuitry 24 in host subsystem may analyze image data from a monitoring image sensor, such as secondary sensor 14B, in order to identify the changes in the scene.

With some suitable arrangements, step 50 may involve the removal of any camera motion that would otherwise alter the observations of motion in the scene. As an example, if the monitoring image sensor is being held in a user's hand, the monitoring image sensor will generally experience at least some "hand shake." This type of unwanted camera motion can, if desired, be detected and compensated for using any desired image stabilization technique, including image analysis, gyroscopic measurements, accelerometer measurements, etc.

In step 52, image sensor operating conditions may be adjusted in response to the changes detected in step 50. As an example, if the monitoring image sensor detected an increase in the amount of movement in the scene in step 50, step 52 might involve directing the primary imaging sensor 14A to increase the frame rate at which it captures images, such that the motion is captured without motion blur. In other words, the new framerate of the primary imaging sensor 14A may be a function of the magnitude of the motion detected in step 50. Similarly, if the monitoring image sensor detected a decrease in the amount of movement in the scene, step 52 might involve reducing the frame rate of the primary imaging sensor 14A. Increases in the frame rate may generally be performed immediately after detection of an increase in movement. Decreases in the frame rate may also be performed immediately after detection of a decrease in movement or, if desired, after some predetermined delay.

Other image sensor operating conditions of the primary imaging sensor 14A that may be adjusted based on information from the secondary imaging sensor 14B in step 52 include, as examples, integration time, gain settings, white-balance settings, auto-focus settings, etc. The changes in the operating conditions of the primary imaging sensor 14A may be made based on various changes detected in step 50. As examples, the changes detected in step 50 that result in adjustments in step 52 may include movement of identified interest points and/or objects in the scene, changes in the color of a scene, changes in the light intensity of the scene, etc. Interest points and/or objects may be defined dynamically, e.g., may be context sensitive. As an example, any movement observed by a security camera may be defined by a user to be relevant, whereas a traffic camera may be programmed to ignore movement outside of road and sidewalk space. Detailed explanations of the techniques for identifying interest points and areas of interest have been omitted for brevity.

With one suitable arrangement, step 52 may involve directing the primary imaging sensor 14A to record only a fraction of the scene being imaged. As an example, if the secondary imaging sensor 14B identifies an object of interested in the bottom half of the viewing range of the primary imaging sensor 14A in step 50, the primary sensor 14A may be directed to record only pixels that image the bottom half of the viewing range.

If desired, step 52 might involve reducing the frame rate of the primary imaging sensor 14A to zero, as long as certain conditions are met. For example, if the monitoring imaging sensor 14B detects that there is no movement in the scene, that any movement is not of interest (e.g., is outside of an area of interest, is not associated with an object identified as being of interest, is merely associated with movement of the camera system, etc.), and/or that any movement is below a predetermined threshold, the primary imaging sensor 14A may be powered down and placed into a low power standby mode. Once there is sufficient movement, the primary imaging sensor 14A may be restarted at a non-zero frame rate.

In step 54, the primary imaging sensor 14A may capture images at the new frame rate, determined in step 52. If the new frame rate is set to zero, step 54 may involve placing the primary imaging sensor 14A into a low power standby mode while the secondary imaging sensor 14B continues to look for changes in the scene (in step 50).

The operations of FIG. 5 may enable a real-time or near-real-time optimization of the amount and quality of data collected by the primary image sensor 14A, balanced with an optimization of the power consumption of the overall device 10, for a given set of imaging objectives. As an example, when device 10 is a security camera, the operations of FIG. 5 may generally reduce the amount of data coming from the camera module, by not capturing frames that do not contain interesting information; while increasing the quality of data, by capturing interesting moments with a high frame rate (e.g., by reducing motion blur); and while decreasing the power consumption of device 10, by allowing the primary imaging sensor 14A to be placed into a low power standby mode when not needed. Additionally and since the long-term bandwidth of images from the primary imaging sensor 14A may generally be lower, device 10 may be designed with smaller and cheaper storage buffers and communications links, relative to conventional fixed-frame rate cameras.

Figure 6:
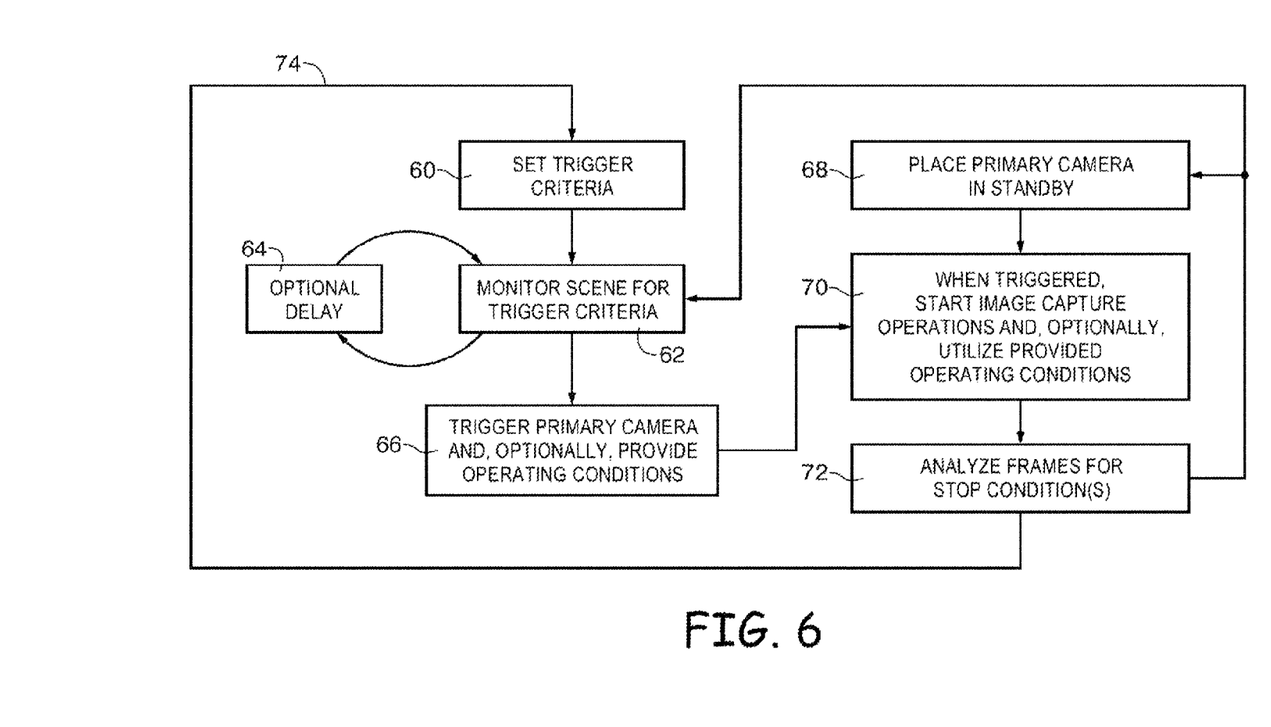
FIG. 6 is a flowchart of illustrative steps involved in monitoring for trigger events and activating an image sensor in response to the triggering events in an adaptive image sensor system in accordance with embodiments of the present invention.

If desired, a monitoring imaging sensor such as secondary imaging sensor 14B may be used in triggering primary imaging sensor 14A. An example of an arrangement of this type is shown in FIG. 6.

In step 60, device 10 may obtain trigger criteria (e.g., criteria indicating the conditions that result in the primary imaging sensor 14A beginning image capture operations). The trigger criteria may be preprogrammed into device 10, may be obtained from a user of device 10, may be determined dynamically by device 10, and may be obtained by any other suitable means. As examples, the trigger criteria may be the detection of an interest point or object in the scene (e.g., a person's face, a person, a baseball, an airplane, wildlife, or any other object), the detection of a particular individual or object in the scene (e.g., a particular person's face or body, a particular species of animal, etc.), the detection of motion above a given threshold in the scene, the detection of motion in a predefined or user-defined region of the scene, the detection of a change in the color of the scene, the detection of a change in the light intensity of the scene, the detection of a change in the light intensity of an interest point, object, person, etc. If desired, the detection criteria may be context dependent. As an example, device 10 could be configured to trigger primary imaging sensor 14A at the start of a flower's blooming process. The trigger criteria may, in such an example, be based on movement or color change patterns (e.g., early-stage blooming movement) of the flower being imaged. The trigger criteria may, if desired, by combined in any desired manner.

In step 62, the secondary imaging sensor 14B may monitor the scene (e.g., the region being imaged by device 10) for the trigger criteria specified in step 60. The secondary imaging sensor 14B may continually monitor the scene for the trigger criteria. As an alternative and whenever the secondary imaging sensor 14B does not detect the trigger criteria, the secondary imaging sensor 14B may be shut down to conserve power. As illustrated by step 64, the secondary imaging sensor 14B may be restarted after an optional delay and the scene checked again for the presence of the trigger criteria in step 62.

When the trigger criteria are detected in step 62, the primary imaging sensor 14A may be triggered in step 66. If desired, information on the desired operating conditions may also be provided to the primary imaging sensor 14A in step 66. As an example, the secondary imaging sensor 14B may detect information concerning the level of light in the scene (auto-exposure), the color balance of light in the scene (auto-white balance), and focus information in the scene (auto-focus) and may provide this information to the primary imaging sensor 14A in step 66. By providing this type of information, the primary imaging sensor 14A may be able to begin image capture operations in an expedited manner.

The framerate and the resolution of the secondary imaging sensor 14B used in monitoring the scene for trigger criteria in step 62 may be determined based at least in part upon the desired resolution of motion or change detection as well as a desired reaction time. The framerate can, if desired, be programmable and/or dynamically adjustable (e.g., context sensitive). Higher framerates generally reduce the reaction time of the system and reduce the amount of time between the trigger criteria and the activation of the primary imaging sensor 14A. Higher resolutions generally enable the secondary imaging sensor 14B to detect smaller objects and/or smaller amounts of movement.

Prior to step 66, the primary imaging sensor 14A may be in a standby mode in step 68. In the standby mode, the power consumption of the primary imaging sensor 14A may be reduced.

In step 70, the primary imaging sensor 14A may begin image capture operations, when triggered in step 66. The primary imaging sensor 14A may, optionally, utilize information on the operating conditions (e.g., auto-white balance, exposure, and focus settings) obtained by the secondary imaging sensor 14B at least in the initial moments of image capture operations of step 70. At later points in time, the operating conditions may be determined using the primary imaging sensor 14A, the secondary imaging sensor 14B, another sensor, or a combination of these and other sensors.

In step 72, the scene may be monitored for stop conditions. As an example, the stop conditions may be the absence of the trigger criteria specified in step 60. As another example, the stop conditions may be distinct from the trigger criteria. In general, the stop conditions may be specified by the user or preprogrammed, in a fashion similar to that described above in connection with the trigger criteria as specified in step 60. Step 72 may involve the analysis of frames captured by the primary imaging sensor 14A, the secondary imaging sensor 14B, another sensor, or a combination of these and other sensors.

Once a stop condition is detected in step 72, the primary imaging sensor 14A may be placed into the standby mode of step 68, at least until trigger criteria are again detected in step 62.

With at least some suitable arrangements, the trigger criteria may be adjusted based on recent images (e.g., recent image context). In these types of arrangements, step 72 may include determining if the desired trigger criteria have changed and, as illustrated by line 74, altering the trigger criteria in step 60 accordingly. As an example and returning to the blooming flower example, step 72 may include determining that the flower has substantially completed its blooming process and determining that the trigger criteria should be adjusted to trigger primary imaging sensor 14A when motion indicative of the start of the death of the flower bloom is detected. With this type of arrangement, the imaging system may capture both the blooming process and the bloom's decay (e.g., the flower petals falling off).

The operations of FIGS. 5 and 6 may enable various implementations such as an imaging system with adaptive time lapse and an imaging system with adaptive slow motion. In the time lapse example, device 10 may be triggered to capture one frame (or a given number of frames) in response to the detection of trigger criteria such as an object moving a given amount. In this manner, device 10 may be able to capture a time lapse image of clouds, by capturing an image whenever the clouds move by a given amount. Device 10 will not, however, capture unnecessary images in which clouds have not moved relative to earlier images. In the slow motion example, device 10 may be triggered to capture video at a high framerate in response to the detection of trigger criteria. In this manner, device 10 may be able to capture slow motion video of a vehicle running a red light. These are merely illustrative examples.

Figure 7:
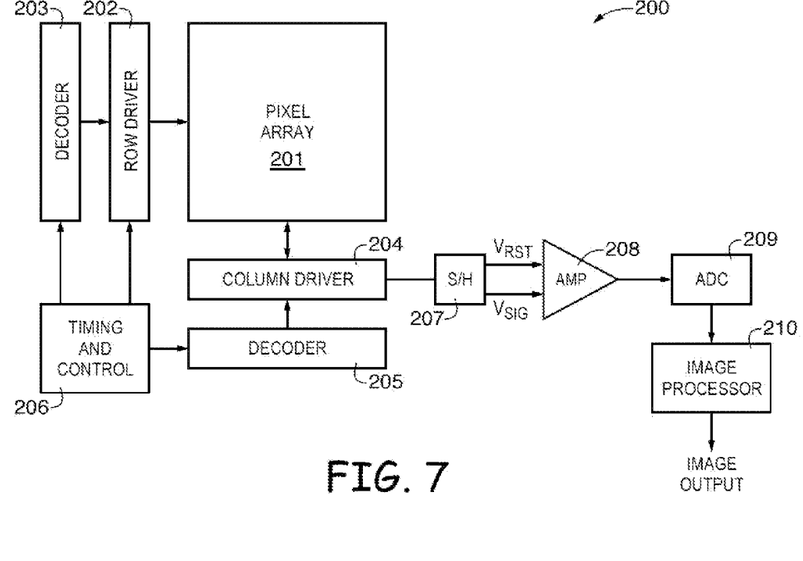
FIG. 7 is a block diagram of an imager employing one or more of the embodiments of FIGS. 1-6 in accordance with embodiments of the present invention.

FIG. 7 illustrates a simplified block diagram of imager 200 (e.g., an imager that may adaptively adjust image sensor operating conditions such as frame rate based on observation of a scene being imaged). Pixel array 201 includes a plurality of pixels containing respective photosensors arranged in a predetermined number of columns and rows. The row lines are selectively activated by row driver 202 in response to row address decoder 203 and the column select lines are selectively activated by column driver 204 in response to column address decoder 205. Thus, a row and column address is provided for each pixel.

CMOS imager 200 is operated by a timing and control circuit 206, which controls decoders 203, 205 for selecting the appropriate row and column lines for pixel readout, and row and column driver circuitry 202, 204, which apply driving voltages to the drive transistors of the selected row and column lines. The pixel signals, which typically include a pixel reset signal Vrst and a pixel image signal Vsig for each pixel are sampled by sample and hold circuitry 207 associated with the column driver 204. A differential signal Vrst−Vsig is produced for each pixel, which is amplified by amplifier 208 and digitized by analog-to-digital converter 209. The analog to digital converter 209 converts the analog pixel signals to digital signals, which are fed to image processor 210 which forms a digital image.

Figure 8:
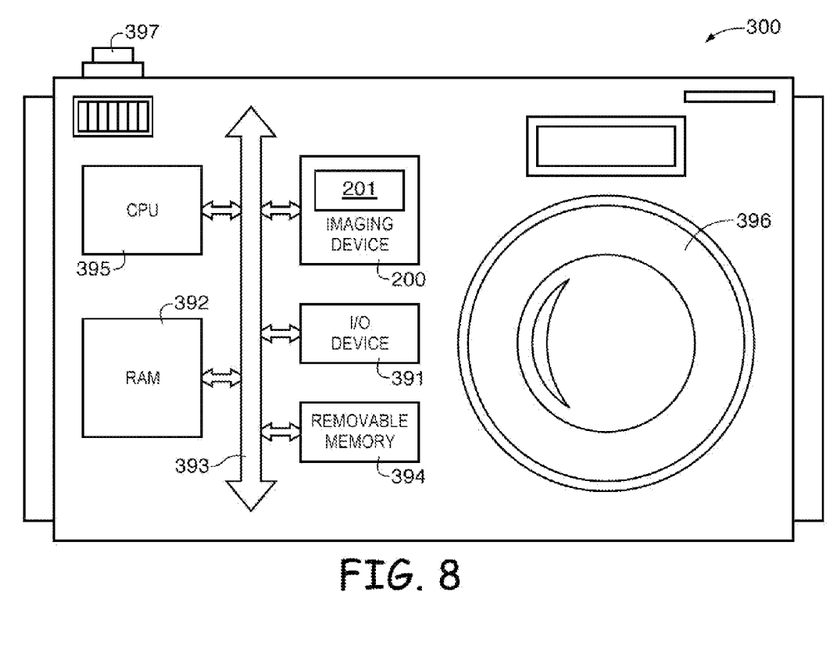
FIG. 8 is a block diagram of a processor system employing the imager of FIG. 7 in accordance with embodiments of the present invention.

FIG. 8 shows in simplified form a typical processor system 300, such as a digital camera, which includes an imaging device such as imaging device 200 (e.g., an imager that may adaptively adjust image sensor operating conditions such as frame rate based on observation of a scene being imaged). Processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating imaging devices. An imaging device may include a primary imaging sensor and a secondary imaging sensor. The secondary imaging sensor may monitor a scene being imaged by the imaging device for trigger criteria such as sudden movement, changes in the intensity of ambient light, and the presence of a particular object or person. Upon detection of relevant trigger criteria, the imaging device may activate the primary imaging sensor and capture one or more images of the scene with the primary imaging sensor. Operational parameters of the primary imaging sensor including framerate and exposure settings may be based on data from the secondary imaging sensor. The secondary imaging sensor may have a lower power consumption than the primary imaging sensor such that monitoring the scene with the secondary imaging sensor and only activating the primary imaging sensor upon detection of the relevant trigger criteria enables an efficient and adaptive imaging system.

The foregoing is merely illustrative of the principles of this invention which can be practiced in other embodiments.

What is claimed is:

1. A method of operating an electronic device having first and second imaging sensors, wherein the first imaging sensor has a higher framerate than the second imaging sensor, the method comprising:
operating the first imaging sensor in an active mode in which the first imaging sensor captures video of a scene;
with the first imaging sensor, monitoring the scene for a predefined stop criterion;
with the first imaging sensor, detecting the predefined stop criterion in the scene;
with control circuitry in the electronic device and based upon the detection of the predefined stop criterion in the scene, switching the first imaging sensor into a power-conserving standby mode;
while the first imaging sensor is in the power-conserving standby mode, monitoring the scene for a predefined trigger criterion with the second imaging sensor;
with the second imaging sensor, detecting the predefined trigger criterion in the scene; and
with the control circuitry in the electronic device and based upon the detection of the predefined trigger criterion in the scene with the second imaging sensor, switching the first imaging sensor into the active mode in which the first imaging sensor captures video of a scene.

2. The method defined in claim 1 wherein the predefined trigger criterion comprises movement that is greater than a given displacement.

3. The method defined in claim 1 wherein the predefined trigger criterion comprises movement that is greater than a given displacement and that is located in a predefined subset of the scene.

4. The method defined in claim 1 wherein the predefined trigger criterion comprises movement that is greater than a given velocity.

5. The method defined in claim 1 wherein the predefined trigger criterion comprises detection of a person in the scene.

6. The method defined in claim 1 wherein the predefined trigger criterion comprises identification of a person in the scene.

7. The method defined in claim 1 wherein the predefined trigger criterion comprises identification of a given person's face in the scene.

8. The method defined in claim 1 wherein the predefined stop criterion comprises the absence of the predefined trigger criterion.

9. A method of operating an electronic device having first and second imaging sensors, the method comprising:
operating the first imaging sensor in an active mode in which the first imaging sensor captures video of a scene;
analyzing the captured video of the scene, wherein analyzing the captured video comprises detecting a predefined trigger criterion and detecting ambient light; and
in response to detecting the predefined trigger criterion with the first imaging sensor, activating the second imaging sensor in the electronic device and capturing video, wherein activating the second imaging sensor and capturing video comprises utilizing information obtained from analyzing the captured video from the first imaging sensor to adjust operational parameters of the second imaging sensor, and wherein the information obtained from the analysis of the captured video comprises information describing the speed of at least one object in the scene.

10. The method defined in claim 9 wherein the information describing the speed of at least one object in the scene comprises information describing the speed of a fastest moving object in the scene.

11. The method defined in claim 9 wherein the operational parameters that are adjusted comprise a framerate of the second imaging sensor.

12. The method defined in claim 9 wherein the operational parameters that are adjusted comprise exposure settings, white-balance settings, and focus settings.

13. A method, comprising:
with at least one imaging sensor in an electronic device, imaging a scene at a first framerate;
with the at least one imaging sensor, detecting a change in the scene; and
after detecting the change in the scene, adjusting the framerate of the at least one imaging sensor to a second framerate based upon the detected change in the scene, wherein imaging the scene at the first framerate with the at least one imaging sensor comprises imaging the scene at the first framerate with a primary imaging sensor, wherein detecting the change in the scene with the at least one imaging sensor comprises detecting the change in the scene with a secondary imaging sensor, and wherein adjusting the framerate of the at least one imaging sensor to the second framerate based upon the detected change in the scene comprises adjusting the framerate of the primary imaging sensor to the second framerate based upon the detected change in the scene.

14. The method defined in claim 13 further comprising:
with the secondary imaging sensor, detecting a series of changes in the scene; and
after each of the changes in the series of changes in the scene, adjusting the framerate of the primary imaging sensor based on that respective change.

15. The method defined in claim 14 wherein detecting the change in the scene comprises detecting movement in a selected region of the scene.

16. The method defined in claim 14 wherein detecting the change in the scene comprises detecting an object moving with a velocity greater than a threshold velocity, wherein adjusting the framerate of the primary imaging sensor to the second framerate comprises increasing the framerate of the primary imaging sensor such that the moving object is imaged substantially without motion blur.

17. The method defined in claim 16 further comprising:
with the secondary imaging sensor, detecting that all objects in the scene are moving with a velocity less than the threshold velocity; and
after detecting that all objects in the scene are moving with a velocity less than the threshold velocity, adjusting the framerate of the primary imaging sensor back to the first framerate.

* * * * *